(12) United States Patent
Baldemair et al.

(10) Patent No.: US 12,095,571 B2
(45) Date of Patent: *Sep. 17, 2024

(54) HARQ CODEBOOK ACKNOWLEDGEMENT SIGNALING FOR RADIO ACCESS NETWORKS

(71) Applicant: Telefonaktiebolaget LM Ericsson (publ), Stockholm (SE)

(72) Inventors: Robert Baldemair, Solna (SE); Stefan Parkvall, Bromma (SE); Erik Dahlman, Stockholm (SE); Sorour Falahati, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/333,264

(22) Filed: Jun. 12, 2023

(65) Prior Publication Data

US 2023/0327816 A1 Oct. 12, 2023

Related U.S. Application Data

(63) Continuation of application No. 17/259,338, filed as application No. PCT/SE2018/050778 on Jul. 26, 2018, now Pat. No. 11,722,260.

(51) Int. Cl.
*H04L 1/1812* (2023.01)
*H04B 7/0456* (2017.01)
*H04L 1/1867* (2023.01)
*H04W 72/0446* (2023.01)
*H04W 72/23* (2023.01)

(52) U.S. Cl.
CPC ......... *H04L 1/1819* (2013.01); *H04B 7/0456* (2013.01); *H04L 1/1896* (2013.01); *H04W 72/0446* (2013.01); *H04W 72/23* (2023.01)

(58) Field of Classification Search
CPC .... H04L 1/1819; H04L 1/1896; H04W 72/23; H04W 72/0446; H04B 7/0456
See application file for complete search history.

(56) References Cited

U.S. PATENT DOCUMENTS

| | | |
|---|---|---|
| 11,177,927 B2 | 11/2021 | Liu et al. |
| 2011/0200016 A1* | 8/2011 | Bergman ............ H04L 1/1614 370/335 |

(Continued)

OTHER PUBLICATIONS

International Search Report and Written Opinion dated Apr. 15, 2019 for International Application No. PCT/SE2018/050778 filed on Jul. 26, 2018, consisting of 11-pages.

(Continued)

*Primary Examiner* — Jael M Ulysse
(74) *Attorney, Agent, or Firm* — Weisberg I.P. Law, P.A.

(57) ABSTRACT

There is disclosed a method of operating a user equipment in a radio access network. The method includes transmitting acknowledgement signaling according to a HARQ codebook at a second HARQ transmitting occasion, the HARQ codebook indicating first acknowledgement information, the first acknowledgement information pertaining to first data signaling scheduled to be received by the user equipment before a first HARQ transmitting occasion that occurred earlier in time than the second HARQ transmitting occasion. The disclosure also pertains to related devices and methods.

20 Claims, 5 Drawing Sheets

(56) References Cited

U.S. PATENT DOCUMENTS

| | | | |
|---|---|---|---|
| 2017/0273056 A1* | 9/2017 | Papasakellariou | H04W 52/146 |
| 2018/0019843 A1* | 1/2018 | Papasakellariou | H04L 1/1864 |
| 2018/0278373 A1 | 9/2018 | Wang et al. | |
| 2018/0279266 A1 | 9/2018 | Li et al. | |
| 2018/0310257 A1* | 10/2018 | Papasakellariou | H04W 52/367 |
| 2019/0045489 A1 | 2/2019 | He et al. | |
| 2019/0081764 A1* | 3/2019 | Guan | H04L 1/16 |
| 2019/0103943 A1* | 4/2019 | Wang | H04L 1/1854 |
| 2019/0109677 A1 | 4/2019 | Wang et al. | |
| 2019/0223205 A1 | 7/2019 | Papasakellariou | |
| 2019/0313342 A1 | 10/2019 | Papasakellariou et al. | |
| 2019/0363840 A1* | 11/2019 | Wang | H04L 1/1864 |
| 2019/0379489 A1 | 12/2019 | Hwang et al. | |
| 2020/0084789 A1* | 3/2020 | Wang | H04L 1/1825 |
| 2021/0050948 A1 | 2/2021 | Gao et al. | |
| 2021/0153185 A1 | 5/2021 | Schober et al. | |
| 2021/0176011 A1* | 6/2021 | Lei | H04L 1/1896 |
| 2021/0184801 A1 | 6/2021 | El Hamss et al. | |
| 2021/0203451 A1 | 7/2021 | Let et al. | |

OTHER PUBLICATIONS

3GPP TSG RAN WG1 meeting 90bis R1-1717075; Title: HARQ timing, multiplexing, bundling, processing time and number of processes; Agenda Item: 7.3.3.2; Source: Huawei, HiSilicon; Document for: Discussion and decision; Location and Date: Prague, Czech Republic, Oct. 9-13, 2017, consisting of 10-pages.

* cited by examiner

HARQ CODEBOOK ACKNOWLEDGEMENT SIGNALING FOR RADIO ACCESS NETWORKS

CROSS-REFERENCE TO RELATED APPLICATIONS

This application is a Continuation of U.S. application Ser. No. 17/259,338 filed Jan. 11, 2021 entitled "HARQ CODEBOOK ACKNOWLEDGEMENT SIGNALING FOR RADIO ACCESS NETWORKS," which is a U.S. National Stage Patent Application of International Application Number: PCT/SE2018/050778, filed Jul. 26, 2018 entitled "HARQ CODEBOOK FOR RADIO ACCESS NETWORKS," the entirety of which is incorporated herein by reference.

TECHNICAL FIELD

This disclosure pertains to wireless communication technology, in particular regarding acknowledgement signaling using a HARQ codebook.

BACKGROUND

Acknowledgement signaling, in particular signaling providing HARQ feedback, plays an important role in modern wireless communication to ensure reliable transmission of data. In some systems, highly flexible and dynamic HARQ feedback may be provided, providing new challenges for implementation.

SUMMARY

It is an object of the present disclosure to provide approaches allowing improved acknowledgement signaling, in particular in the context of leftover HARQ bits and/or post-scheduled signaling. The approaches are particularly advantageously implemented in a $5^{th}$ Generation (5G) telecommunication network or 5G radio access technology or network (RAT/RAN), in particular according to 3GPP ($3^{rd}$ Generation Partnership Project, a standardisation organization). A suitable RAN may in particular be a RAN according to NR, for example release 15 or later, or LTE Evolution. The approaches described herein allow efficient operation, limiting retransmissions and related overhead.

There is proposed a method of operating a user equipment in a radio access network, the method comprising transmitting acknowledgement signaling according to a HARQ codebook at a second HARQ transmitting occasion. The HARQ codebook indicates, and/or the acknowledgement signaling includes, first acknowledgement information, the first acknowledgement information pertaining to first data signaling, or first subject signaling, scheduled to be received by the user equipment before a first HARQ transmitting occasion that occurred earlier in time than the second HARQ transmitting occasion.

There is also disclosed a user equipment for a radio access network, the user equipment being adapted to transmit acknowledgement signaling according to a HARQ codebook at a second HARQ transmitting occasion. The HARQ codebook indicates, and/or the acknowledgement signaling includes, first acknowledgement information, the first acknowledgement information pertaining to first data signaling, or first subject signaling, scheduled to be received by the user equipment before a first HARQ transmitting occasion that occurred earlier in time than the second HARQ transmitting occasion. The user equipment may comprise, and/or be adapted for utilising, processing circuitry and/or radio circuitry, in particular a transmitter and/or transceiver and/or receiver, for transmitting the acknowledgement signaling and/or determining acknowledgement information for the signaling, and/or receiving the first data or subject signaling.

A method of operating a radio node in a radio access network is considered. The method comprises receiving acknowledgement signaling from a user equipment according to a HARQ codebook. The acknowledgement signaling includes, and/or the HARQ codebook indicates, first acknowledgement information, the first acknowledgement information pertaining to first data signaling, and/or first subject signaling, scheduled to be received by the user equipment before a first HARQ transmitting occasion that occurred earlier in time than the second HARQ transmitting occasion.

There is also disclosed a radio node for a radio access network, which may in particular be a network node like a gNB or eNB or relay node, etc. The radio node is adapted to receive acknowledgement signaling from a user equipment according to a HARQ codebook. The HARQ codebook indicates, and/or the acknowledgement signaling includes, first acknowledgement information, the first acknowledgement information pertaining to first data signaling, and/or first subject signaling, scheduled to be received by the user equipment before a first HARQ transmitting occasion that occurred earlier in time than the second HARQ transmitting occasion. The radio node may comprise, and/or be adapted for utilising, processing circuitry and/or radio circuitry, in particular a receiver and/or transceiver and/or transmitter, for receiving the acknowledgement signaling and/or for determining the codebook and/or for transmitting the subject signaling or data signaling and/or transmitting one or more control information messages, e.g. scheduling assignments.

A HARQ codebook may provide a mapping of ACK/NACK bits or bit groups to HARQ processes, and/or transport blocks and/or code block groups. The codebook may indicate size (e.g., in number of bits) and/or arrangement of bits or bit groups. A codebook indicating first acknowledgment information may be considered to map bits of acknowledgment information to data signaling or subject signaling to which the first acknowledgment information pertains. The UE and radio node may have their own interpretations of the HARQ codebook, e.g. in terms of storage format or representation.

Receiving acknowledgment signaling based on a HARQ codebook may comprise mapping bits of the acknowledgement signaling according to the codebook, e.g. to HARQ processes and/or transport blocks and/or code block groups. It may be considered that receiving acknowledgement signaling is based on, and/or comprises, transmitting scheduling assignments and/or subject signaling and/or configuring the UE with the HARQ codebook, and/or may comprise performing retransmission based on the acknowledgement signaling.

The first acknowledgment information may be based on, and/or comprise, ACK/NACK bits that have not been transmitted at the first HARQ transmission occasion, e.g. due to being leftover bits (or post-scheduled bits). Such leftover bits may occur, e.g. if subject transmission is scheduled in a time interval shortly before a (next) HARQ transmission occasion, such that the UE does not have time to determine and/or include the associated ACK/NACK bits into the next acknowledgement signaling. In some cases such a time interval may be based on UE capabilities, and/or a minimum time for determining the acknowledgement information may be predefined or configured or configurable; e.g. such that the UE is not expected to be able to provide the acknowledgement information.

Subject transmission and/or data signaling may comprise one or more transmissions on one or more channel, which may be scheduled separately, e.g. with control information messages, e.g. scheduling assignments and/or DCI messages. In particular, the data signaling may comprise one or more PDSCH transmissions, which may be time-multiplexed and/or frequency-multiplexed. The transmissions may pertain to the same carrier or carriers of the same carrier aggregation. For time-multiplexed transmissions, a total DAI may represent the total number of transmission pertaining to the associated HARQ codebook per signal transmission occasion.

A transmission occasion may generally represent a time interval allocated for transmissions, e.g. on a downlink channel or uplink channel. UE and network node will see shifts in timing due to signal traveling time and/or timing advance, of which they are aware. A transmission occasion as seen from a radio node may be considered to refer to a time interval and/or time/frequency resources over the time interval in which the node may transmit a transmission itself, or in which may expect a transmission, and/or monitors for a transmission, to be received. A subject transmission occasion may for example be associated to PDSCH (in particular for data signaling) or PDCCH transmission. A HARQ transmission occasion may be associated to PUCCH or PUSCH ("UCI on PUSCH"). Acknowledgement information may be punctured or rate-matched on PUSCH, e.g. depending on size (e.g., punctured for 2 bit or smaller, else rate-matched). A transmission occasion may comprise, and/or be represented by a one or more symbols in a slot, which may be arranged contiguous in time. In some variants, a transmission occasion, e.g. the first and/or second transmission occasion, is and/or are shorter in time than a slot, e.g. covering one of a number between 2 to 13 symbols. Different occasions may differ in duration (number of symbols), or may be equal, e.g. based on scheduling and/or control information message/s. Between a first HARQ transmission occasion and a second HARQ transmission occasion (in time domain) there may be zero, or more than zero, e.g. 1, 2 or more, other HARQ transmission occasions, which may pertain to the same carrier or carrier aggregate or channel/s as the first and/or second HARQ transmission occasion. In general, a HARQ transmission occasion may also be referred to as acknowledgement occasion or reporting occasion or feedback occasion.

The first acknowledgment information is indicated by the HARQ codebook based on an inclusion indication. The inclusion indication may explicitly or implicitly indicate that the first acknowledgement information is to be indicated in the codebook, and/or whether or not to indicate the first acknowledgement information with the codebook, Indicating the information by the codebook may refer to the information being included in the codebook, and/or that the codebook is to be interpreted to include the first acknowledgement information (or not to include, e.g. depending on the inclusion indication). The inclusion indication may be implemented as a flag, or bit field with more than 1 bit, and/or a combination of more than one flag/s and/or bit field/s. In some variants, the inclusion indication may indicate, e.g. implicitly or explicitly, how many bits of first acknowledgement information are to be included. The inclusion indication may for example be implemented as counter like a DAI (e.g., counter DAI and/or total DAI and/or uplink DAI). The inclusion indication may be provided in one message, e.g. a control information message, in particular a scheduling assignment and/or grant and/or DCI message, and/or distributed and/or (wholly or partially) repeated over one or more messages, e.g., DCI and/or scheduling assignment and/or grant. In some cases, such message/s may comprise, and/or be implemented as higher layer signaling, e.g. RRC and/or MAC.

It may be considered that the HARQ codebook indicates second acknowledgement information pertaining to data signaling scheduled to be received later in time than the first HARQ transmitting occasion, and/or before the second HARQ transmission occasion. IT may be considered that the first acknowledgement information pertains to subject signaling received, or scheduled to be received, before the first HARQ transmission occasion, and the second acknowledgement information to subject signaling received, or scheduled to be received, after the first HARQ transmission occasion and before the second HARQ transmission occasion.

The first acknowledgement information may be based on logical-AND concatenation of a plurality of ACK/NACK bits associated to the first data signaling. For example, an AND operation may be performed for ACK/NACK bits on code block group level and/or transport block level, and/or to concatenate to a prescribed number of bits, e.g. as indicated by an inclusion indication. In general, the first acknowledgement information may be based on a plurality of ACK/NACK bits with a size (e.g., number of bits) larger than the bit-size of the acknowledgement information. In some cases, bits may be dropped from the ACK/NACK bits to achieve the bit-size of the first acknowledgement information.

The HARQ codebook, and/or the bit-size of the first acknowledgement information, may be determined based on control information signaling including a counter, wherein the counter pertains to second acknowledgment information pertaining to data signaling scheduled to be received later in time than the first HARQ transmitting occasion, wherein the counter starts at a value larger than a reset value to indicate inclusion of the first acknowledgment information. A reset value may be the value used for indicating a first count, and/or be represented by 0 or in some cases 1, depending on convention used. Alternatively, or additionally, a counter may be start at a value indicating and/or corresponding to a number of bits and/or subject transmission occasions to be reported on with the first acknowledgement information.

In general, the HARQ codebook may be a dynamic HARQ codebook, whose size may for example be determined based on control information in one or more messages, e.g. DCI messages. In particular, the size of the codebook may be determined based on a largest counter values associated to the HARQ transmission occasion to which the codebook pertains, e.g. an uplink DAI or total DAI or counter DAI of largest value, e.g. as received by the UE and/or determined by the network or network node. A counter may generally be represented by a bit field, e.g. having a size NC, wherein NC may be 2 or 3 in some cases. Different counters may have different or equal sizes in bits. The value of a counter may be based on a modulo operation, e.g. a number MC to be represented modulo NB. NB may represent and/or be based on the maximum value of the counter, and/or the number of different values representable by the counter. MC may represent a number of bits and/or HARQ processes and/or subject transmission occasions.

The first acknowledgement information, and/or second acknowledgement information pertaining to data signaling scheduled to be received later in time than the first HARQ transmitting occasion, includes ACK/NACK bits pertaining to one or more code block groups, and/or transport block/s.

In general, an inclusion indication indicating inclusion of the first acknowledgement information into the acknowledgement signaling based on the HARQ codebook is transmitted in a downlink control information message.

It may be considered that ACK/NACK bits associated to the first data signaling may be determined before scheduled reception of second data signaling or subject transmission scheduled to be later in time than the first HARQ transmission occasion, and/or before the first HARQ transmission occasion.

The first HARQ transmission occasion may be in a different time slot than the second HARQ transmission occasion.

It may be considered in general that transmission is in TDD, e.g. dynamic TDD, which may be configured or scheduled with DCI or SCI or higher layer messages. Alternatively, transmissions may be in FDD.

The inclusion indication may be provided by a counter, e.g. a counter or running DAI (Downlink Assignment Indicator), and/or a total DAI. Such a DAI or DAIs may be provided with control information, e.g. downlink control information. In some cases, a counter may be an uplink DAI, which may be a DAI provided in a scheduling grant, which may schedule uplink transmission. A DAI may be adapted, e.g. by the radio node or network node, in particular based on non-reception of the previous scheduled transmission of acknowledgement signaling, to count and/or represent scheduled subject transmissions and/or associated HARQ processes or acknowledgement information associated to the previous scheduled transmission (e.g., according to an associated first HARQ codebook), and in addition may count additional scheduled subject transmissions and/or associated HARQ processes or acknowledgement information, e.g. associated to a later scheduled occasion. One or more previous scheduled transmissions or associated occasions may be included. The HARQ codebook for the transmitted acknowledgement signaling may be considered a combination of codebooks for the more than one occasion, e.g. the first occasion and the second occasion, and optionally one or more occasions therebetween.

In general, the inclusion indication may be provided by a bit field comprising one or more bits, and/or may be provided implicitly or explicitly. Examples of such an indication may comprise one or more DAIs, or New Feedback Indicator (NFI) or a group common indicator.

It may be considered that the HARQ codebook includes HARQ feedback associated to previous scheduled transmission, e.g. for corresponding subject transmission/s.

Previous (first) scheduled acknowledgement signaling may be scheduled for a first HARQ transmission occasion, which may be earlier in time than the second HARQ transmission occasion associated to the transmitted acknowledgement signaling. The first occasion may be the last occasion before the second occasion, or one or more occasions may be inbetween. An occasion may indicate time and/or frequency resources available, e.g. scheduled and/or configured, for transmitting acknowledgement signaling. Such resources may be represented in a resource range or set of resources. Acknowledgement signaling may be considered UCI signaling or SCI signaling. At the first occasion, the previous scheduled transmission may have occurred, or it may have failed, e.g. due to unsuccessful LBT procedure.

A HARQ codebook may indicate the size in bits of acknowledgment or feedback information to be transmitted, and/or the arrangement and/or association of bits to subject transmission and/or HARQ processes. The HARQ codebook may be a dynamic codebook, which may be determined based on one or more indications in one or more control information messages, e.g. DCI messages. It may also be determined based on a rescheduling indication. A control information message in this context may in particular a scheduling assignment, which may indicate subject transmission for feedback, and/or reporting timing and/or frequency resources and/or code resources. Reporting timing may indicate a timing for scheduled acknowledgement signaling, e.g. slot and/or symbol and/or resource set.

In general, the HARQ codebook may include rescheduled HARQ feedback, e.g. from the first occasion.

It may be considered that a previous (first) scheduled transmission of acknowledgement information is scheduled for a slot T+N1, and the second transmission of acknowledgement signaling is transmitted in slot T1+N2, wherein N2>N1. Thus, T+N1 may be considered to pertain to or to indicate the first occasion or corresponding first reporting timing, T+N2 may be considered to pertain to or to indicate the second occasion or corresponding second reporting timing.

The acknowledgement signaling may transmitted on a control channel or a data channel. The channel may be a physical channel. Example control channels are PUCCH or PSCCH, example data channels or PUSCH or PSSCH. In some cases, the previous (first) scheduled transmission of acknowledgement signaling may be associated to a different channel than the transmitted (second) acknowledgement signaling. In particular, the previous scheduled transmission may be scheduled for PUCCH or PSCCH, wherein in some variants the transmission may occur (at the second occasion) on PUSCH or PSSCH, respectively. It may be assumed that in this context it is not switched between sidelink and uplink.

There is also considered a program product comprising instructions adapted for causing processing circuitry to control and/or perform a method as described herein. Moreover, a carrier medium arrangement carrying and/or storing a program product as described herein may be considered. A system comprising a network node and a UE as described herein is also described, as well as an associated information system.

Subject transmission like data signaling may comprise one or more individual transmissions. Scheduling assignments may comprise one or more scheduling assignments. It should generally be noted that in a distributed system, subject transmissions, configuration and/or scheduling may be provided by different nodes or devices or transmission points. Different subject transmissions may be on the same carrier or different carriers (e.g., in a carrier aggregation), and/or same or different bandwidth parts, and/or on the same or different layers or beams, e.g. in a MIMO scenario, and/or to same or different ports. Generally, subject transmissions may pertain to different HARQ processes (or different sub-processes, e.g. in MIMO with different beams/layers associated to the same process identifier, but different sub-process-identifiers like swap bits). A scheduling assignment and/or a HARQ codebook may indicate a target HARQ structure. A target HARQ structure may for example indicate an intended HARQ response to a subject transmission, e.g. the number of bits and/or whether to provide code block group level response or not. However, it should be noted that the actual structure used may differ from the target structure, e.g. due to the total size of target structures for a subpattern being larger than the predetermined size.

Transmitting acknowledgement signaling, also referred to as transmitting acknowledgement information or feedback information or simply as HARQ feedback or feedback or reporting feedback, may comprise, and/or be based on determining correct or incorrect reception of subject transmission/s, e.g. based on error coding and/or based on scheduling assignment/s scheduling the subject transmissions. Transmitting acknowledgement information may be based on, and/or comprise, a structure for acknowledgement information to transmit, e.g. the structure of one or more subpatterns, e.g. based on which subject transmission is scheduled for an associated subdivision. Transmitting acknowledgement information may comprise transmitting corresponding signaling, e.g. at one instance and/or in one message and/or one channel, in particular a physical channel, which may be a control channel. In some cases, the channel may be a shared channel or data channel, e.g. utilising rate-matching of the acknowledgment information. The acknowledgement information may generally pertain to a plurality of subject transmissions, which may be on different channels and/or carriers, and/or may comprise data signaling and/or control signaling. The acknowledgment information may be based on a codebook, which may be based on one or more size indications and/or assignment indications (representing HARQ structures), which may be received with a plurality of control signalings and/or control messages, e.g. in the same or different transmission timing structures, and/or in the same or different (target) sets of resources. Transmitting acknowledgement information may comprise determining the codebook, e.g. based on control information in one or more control information messages and/or a configuration. A codebook may pertain to transmitting acknowledgement information at a single and/or specific instant, e.g. a single PUCCH or PUSCH transmission, and/or in one message or with jointly encoded and/or modulated acknowledgement information. Generally, acknowledgment information may be transmitted together with other control information, e.g. a scheduling request and/or measurement information.

Subject signaling on which is reported at one HARQ transmission occasion may be from different subject transmission occasions, e.g. in different slots. However, in some cases, some or all subject transmission occasions may coincide, e.g. be in the same time interval and/or slot.

BRIEF DESCRIPTION OF THE DRAWINGS

The drawings are provided to illustrate concepts and approaches described herein, and are not intended to limit their scope. The drawings comprise.

DETAILED DESCRIPTION

In the following, concepts and approaches are described in the context of NR technology. However, the concepts and approaches may be applied to other RATs and/or carrier types. Moreover, the concepts and approaches are discussed in the context of communication between network node (gNB) and UE, for downlink subject transmission, but also may be applied to uplink, or in a sidelink scenario, in which case both involved radio nodes may be UEs, or in a backhaul or relay scenario, in which cases both radio nodes may be network nodes.

Figure 1:
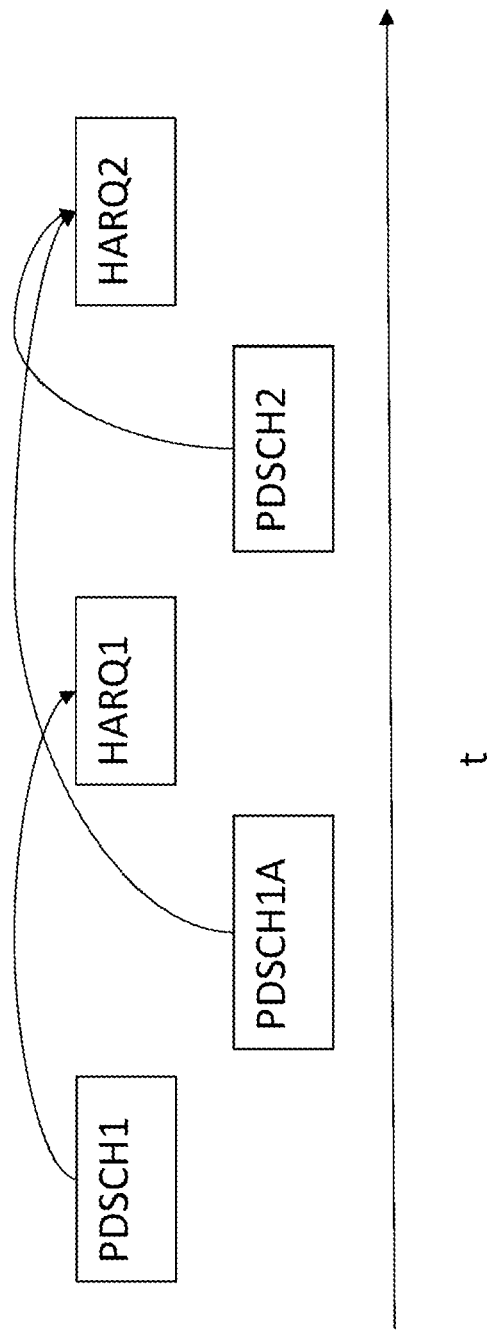
FIG. 1, exemplarily showing transmitting acknowledgement signaling including leftover bits.

FIG. 1 shows an example of transmitting leftover HARQ bits in a codebook comprising first acknowledgement information (representing the leftover bits) and second acknowledgement information. It is noted that HARQ bits represent ACK/NACK bits. In FIG. 1, subject transmissions are implemented as data signaling on PDSCH. Transmissions PDSCH1 and PDSCH1A are scheduled, e.g. with scheduling assignments, to be received before a first HARQ transmission occasion HARQ1. PDSCH2 is scheduled to be received after HARQ1, and to be reported on at second HARQ transmission occasion HARQ2, which is later in time than HARQ1 (and PDSCH1, PDSCH1A, PDSCH2, for that matter). In some cases, subject transmission may be in the same slot as the associated HARQ transmission occasion, however, some or all subject transmission may be in different slots than the HARQ transmission. As determining the HARQ bits for PDSCH1A may take too long to include them in HARQ1 transmission of HARQ feedback, first acknowledgement information representing these leftover bits, or determined based thereon, may be included into the HARQ2 transmission. An inclusion indication, e.g. a counter DAI or total DAI, may be used to indicate that the first acknowledgement information is to be included into the HARQ transmission at HARQ2, e.g. indicating the codebook used for the transmission accordingly. The codebooks for different HARQ transmission and/or transmission occasions may in general be different, e.g. based on associated inclusion indications and/or counters. In general, an inclusion indication may be in addition to a counter, which may be reset for the second HARQ transmission occasion. In this case, bits for the first acknowledgement information may be prepended or appended to the bits for second acknowledgement information. The second acknowledgement information may represent HARQ feedback for subject signaling scheduled after the HARQ1 transmission occasion. In the context of this disclosure, subject transmission scheduled for reception in a time interval overlapping or partially overlapping the first HARQ transmission occasion in time, or scheduled for a time interval after the first HARQ transmission occasion, may be considered to be later in time than the first HARQ transmission occasion. Subject transmission scheduled for reception in a time interval overlapping or partially overlapping the first HARQ transmission occasion in time, or scheduled for a time interval before the first HARQ transmission occasion may be considered to be earlier in time than (before) the first HARQ transmission occasion. Analogous relations may hold for the second HARQ transmission occasion. In particular, first acknowledgement information may pertain to subject transmission scheduled for reception in a time interval at least partially overlapping with the first HARQ transmission occasion. However, cases in which no subject transmission overlaps with HARQ transmission occasions may be considered. Overlapping may in particular occur in FDD operation.

NR provides the flexibility in HARQ feedback timing, e.g. to account for dynamic TDD Several HARQ feedbacks (e.g., pertaining to different transmission times of subject signaling and/or different carriers) may be combined, for example for lower overhead and/or higher reliability. The slot timing (e.g., denoted as K1) between DL data transmission and acknowledgement may be determined based on a 3-bit field in DCI. RRC signaling may configure the set of 8 values to be indexed by K1 (possible value range is {0, 1, . . . , 15}; the value may indicate, e.g. reference or represent or index, a timing). NR provides the flexibility to include aggregate feedback corresponding to multiple HARQ processes in one PUCCH/UCI transmission by means of Semi-static and dynamic code books.

For a semi-static HARQ codebook, HARQ codebook size in time (DL association set) is determined based on the configured set of HARQ-ACK timings K1, PDCCH monitoring occasions, and/or semi-static configured transmission pattern, e.g. TDD pattern. For each slot, a UE needs to report a HARQ feedback bitmap of fixed size according to its CA and TB/CBG (Transport Block/Code Block Group) configuration (in this example 7 bit); not received TB/CBG are set to NACK.

For a dynamic HARQ codebook, the codebook provides the possibility to dynamically determine the set of HARQ process for which the HARQ feedback should be reported, based on control signaling, e.g. SCI or DCI signaling. Multiple DCI/SCI messages (e.g., on PDCCH or PSCCH) may contribute to the codebook. The SCI/DCI signaling, e.g. an associated message, may include:

a Sidelink or Downlink assignment indicator (SAI or DAI): that indicates the number of HARQ process that should reported, respectively a number or counter of HARQ processes that should be reported on with the codebook; a counter DAI or SAI may indicate a current number associated to the subject signaling scheduled with the DCI, e.g. of HARQ processes or scheduled subject transmission;

alternatively, or additionally, a total SAI or DAI may be used, which may indicate a total number of processes or scheduled subject transmissions; and/or an indication of reporting timing, e.g. timing for reporting (with acknowledgement information like HARQ-ACK/NACK) on subject transmission scheduled (e.g., PDSCH) that may specify a time resource (or resource range or set) in which the scheduling node (e.g., e/Gnb or UE in a sidelink scenario) is expecting the feedback transmission to occur; the timing may represent the timing of the acknowledgment signaling, e.g. a border symbol, and/or slot, and/or scheduled or configured resources or resource range or resource set for a channel associated to the acknowledgement signaling, e.g. a control channel like PUCCH or PSCCH, or in some cases a data channel like PUSCH or PSSCH (e.g., for UCI on PUSCH or PSSCH, e.g. rate-matching or puncturing the acknowledgement information on PUSCH or PSSCH transmission).

DAI computation for dynamic HARQ codebook may be performed by a network node. The UE refers to the DAI value to calculate the dynamic codebook size. For every PDSCH transmission scheduled, the DAI value in the DCI is incremented. The DAI in the DL scheduling DCI should be stepped by one as compared to the immediate preceding DL scheduling DCI, if not, it is an indication that PDSCH transmission(s) has been missed; it should be noted that multiple scheduling assignments may be multiplexed in time and do not have to be transmitted with different timings. The difference between the two received DAI values at the UE in current and earlier DCI may indicate how many PDSCH transmissions were missed. A total DAI may support this process, but does not have to be included in all scheduling assignments.

Figure 2:
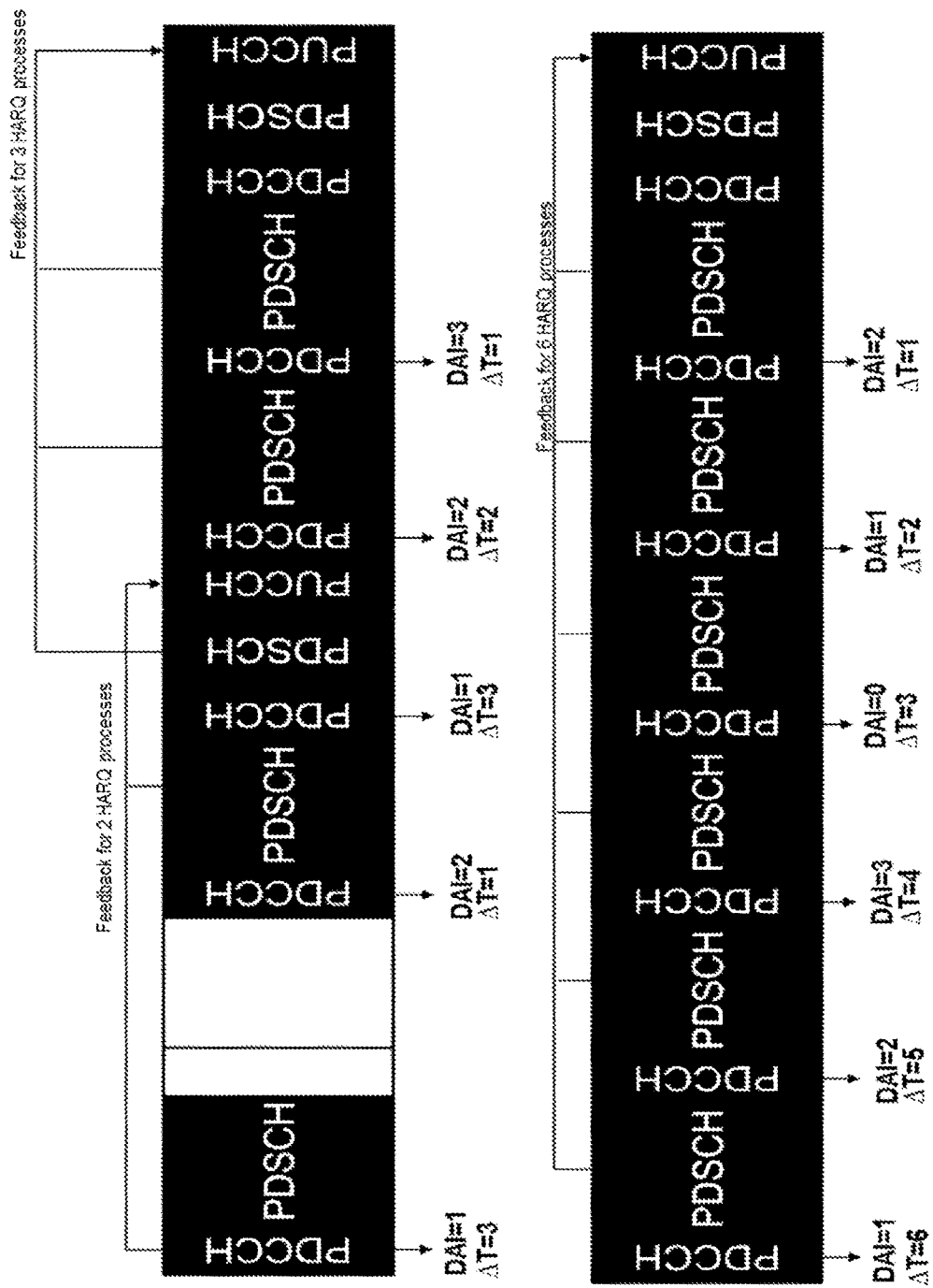
FIG. 2, exemplarily showing determination of a DAI value in Dynamic HARQ codebook.

A DAI indicates the number of HARQ process that should be reported on (for which HARQ feedback should be provided), and/or how many bits of HARQ feedback should be provided. The DAI value in NR rel-15 is only 2-bits (representing 4 possible values 0, 1, 2, 3), after reaching the highest DAI value (i.e. 3), the DAI is wrapped around and starts again from the smallest value, as shown in FIG. 2. This represents a modulo operation for the counter value. It should be noted that an internal counter and the indicated counter value (e.g., with DCI) are related to each other, but not necessarily identical.

The UE may refer to the DAI value to calculate the dynamic code book size. For every scheduled transmission, e.g. PDSCH transmission, the DAI value in the DCI is incremented. The DAI in the DL scheduling DCI should be stepped by one as compared to the immediately preceding DL scheduling DCI. If the UE misses one or more SAs, e.g. PDCCH transmission, it will see that on the next successfully detected DCI that the DAI value has increased by more than 1. The difference between the two DAI value in current and earlier DCI indicates how many PDSCH transmissions were missed. The DAI value in NR rel-15 is only 2-bits, after reaching the highest DAI value (i.e. 4), the value is reset again to the smallest value. This means that if the UE missed 4 or more PDSCH transmission, the UE will not be able to correctly calculate the codebook size, and therefore there will be misalignment between the gNB's expected codebook size and the reported one by the UE. While missing 4 or more consecutive PDSCH on licensed carrier is unlikely, it is more likely to happen on an unlicensed band due to collisions, and thereby, the 2-bit DAI may cause an issue.

Figure 3:
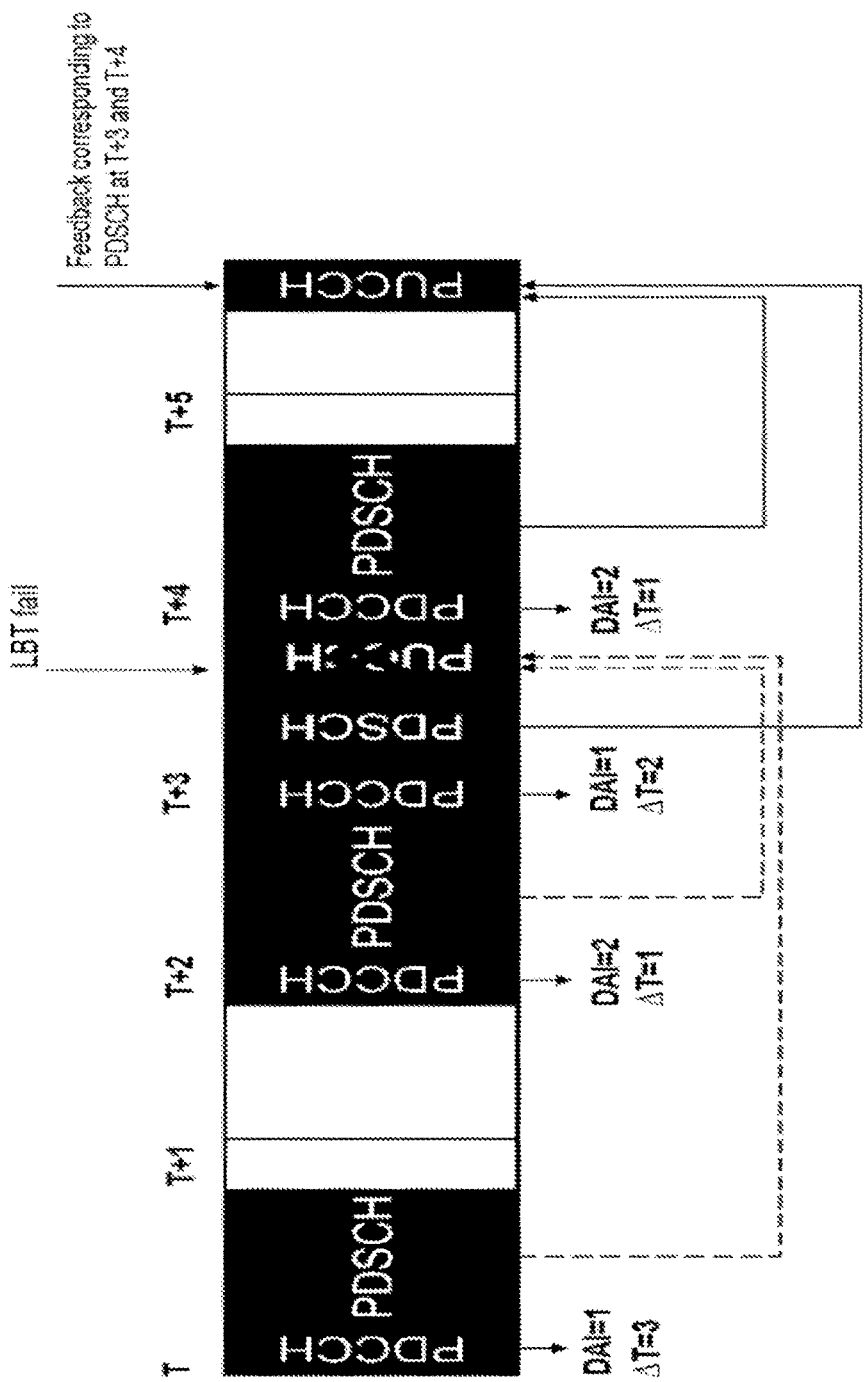
FIG. 3, exemplarily showing DAI computation.

FIG. 3 represents the outcome exemplary operating with DAI values. In this case, the receiving radio node may determine whether the transmission includes the missed feedback or not, e.g. based on the size. Reception may comprise determining whether it is more likely that a received transmission of acknowledgement signaling comprises the missed feedback or not.

The DAI or total DAI in the above examples may be considered an example of an inclusion indication. Alternatively, or additionally, a new inclusion indication may be considered as HARQ scheduling indication, e.g. as a flag or bit field indicating whether to include the first acknowledgement information and/or how many bits to include for such information. It should be noted that when using a counter value based on modulo operation, in some cases ambiguities may occur, e.g. if the inclusion would lead to the counter to be set to its reset value. It may be considered that for this case, a common behaviour is prescribed or configured or configurable (e.g., with RRC signaling, e.g. of a common behaviour indication like a flag or bit field), to define whether this occurrence is to be interpreted to indicate that the first acknowledgement information is to be included or not.

In one approach, it may be considered that a toggle bit or flag or bit combination or bit field in a scheduling assignment or a separate control information message like a DCI may indicate whether to include leftover bits or second acknowledgement information. If it is not toggled (e.g., value=0 or FALSE), acknowledgement signaling on the previous scheduled transmission occasion (also referred to as HARQ-ACK occasion) may be dropped. If it is toggled (e.g., 1 or TRUE), the UE may include the second acknowledgement information. In general, at the first HARQ transmission occasion, acknowledgement information may be transmitted based on a first HARQ codebook, which may be different from the codebook used for transmission at the second HARQ transmission occasion.

It may be considered that a bit field in a scheduling assignment or separate control information message (transmitted after the previous scheduled transmission of acknowledgement signaling should have been received)

may indicate whether to include the missed feedback (leftover bits/first acknowledgement information) in the feedback for the current/second reporting occasion. The bit field may have different states, e.g. a first state (State 1), indicating that the UE should not include the previous/leftover HARQ-ACK bits/feedback (respectively, associated first acknowledgement information) in the next HARQ-ACK reporting occasion (note that a HARQ-ACK bit may generally indicate ACK or NACK, and/or in some cases DTX/DRX). In a second state (state 2), the bit field may indicate that the UE should include the HARQ-ACK bits for the past/previous HARQ-ACK reporting occasion/s in the next reporting occasion on either PUSCH or PUCCH (or another channel to report HARQ-ACK bits on) backwards in time until state 1 was indicated. Alternatively, the UE may include the leftover HARQ-ACK bits or a concatenation thereof and/or the first acknowledgement information from last HARQ-ACK reporting occasion in the next reporting occasion on either PUSCH or PUCCH (or another channel to report HARQ-ACK bits on).

HARQ-ACK bits may in general represent HARQ bits or ACK/NACK bits or acknowledgement information bits.

HARQ-ACK can be reported on either PUCCH or PUSCH. Note also that the gNB may choose to not include first acknowledgement information from the first/previous HARQ transmission occasion if for example too long time has passed since it scheduled the PDSCHs. This may be the case even if it did not receive any HARQ-ACK bits corresponding to the PDSCHs.

The inclusion indication may be sent with a control information message, e.g. sent on PDCCH. As non-limiting examples, the existing DCI format 1_0, and format 1_1 may be extended to include an additional 1-bit field<and/or an existing field in DCI 1_0, and 1_1 can be used with different interpretation. Alternatively, or additionally, using a new DCI format may be considered, which may be scrambled with existing UE specific RNTI or new RNTI. Such a new DCI message may include all or a subset or one of the following: 1 bit indication, DAI (e.g., counter DAI or total DAI), reporting timing indication, e.g. trigger to HARQ ACK timing, for example indicating the time resource/s scheduled for acknowledgement signaling (e.g., for the new occasion after the previous scheduled transmission), frequency resources. The existing DCI 0_1 and 0_0 may be extended to include an additional 1-bit field, which may be to HARQ-ACK feedback reporting multiplexed on PUSCH.

It should be noted that a DCI format may also be referred to as PDCCH format or control information message format.

Figure 4:
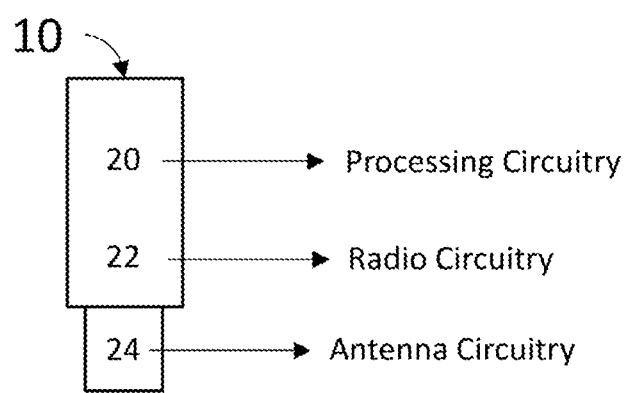
FIG. 4, showing an example of a radio node implemented as a terminal or UE.

FIG. 4 schematically shows a radio node, in particular a terminal or wireless device 10, which may in particular be implemented as a UE (User Equipment). Radio node 10 comprises processing circuitry (which may also be referred to as control circuitry) 20, which may comprise a controller connected to a memory. Any module of the radio node 10, e.g. a communicating module or determining module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein, and/or for sidelink communication. Radio node 10 may generally be adapted to carry out any of the methods of operating a radio node like terminal or UE disclosed herein; in particular, it may comprise corresponding circuitry, e.g. processing circuitry, and/or modules.

Figure 5:
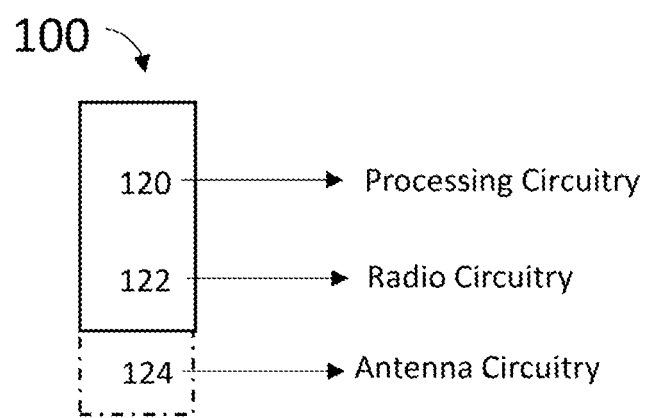
FIG. 5, showing an example of a radio node implemented as a network node, in particular a gNB.

FIG. 5 schematically show a radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein; in particular, it may comprise corresponding circuitry, e.g. processing circuitry, and/or modules. The antenna circuitry 124 may be connected to and/or comprise an antenna array. The node 100, respectively its circuitry, may be adapted to perform any of the methods of operating a network node or a radio node as described herein; in particular, it may comprise corresponding circuitry, e.g. processing circuitry, and/or modules. The radio node 100 may generally comprise communication circuitry, e.g. for communication with another network node, like a radio node, and/or with a core network and/or an internet or local net, in particular with an information system, which may provide information and/or data to be transmitted to a user equipment.

Subject transmission may be data signaling or control signaling. The transmission may be on a shared or dedicated channel. Data signaling may be on a data channel, for example on a PDSCH or PSSCH, or on a dedicated data channel, e.g. for low latency and/or high reliability, e.g. a URLLC channel. Control signaling may be on a control channel, for example on a common control channel or a PDCCH or PSCCH, and/or comprise one or more DCI messages or SCI messages. In some cases, the subject transmission may comprise, or represent, reference signaling. For example, it may comprise DM-RS and/or pilot signaling and/or discovery signaling and/or sounding signaling and/or phase tracking signaling and/or cell-specific reference signaling and/or user-specific signaling, in particular CSI-RS. A subject transmission may pertain to one scheduling assignment and/or one acknowledgement signaling process (e.g., according to identifier or subidentifier), and/or one subdivision. In some cases, a subject transmission may cross the borders of subdivisions in time, e.g. due to being scheduled to start in one subdivision and extending into another, or even crossing over more than one subdivision. In this case, it may be considered that the subject transmission is associated to the subdivision it ends in.

It may be considered that transmitting acknowledgement information, in particular of acknowledgement information, is based on determining whether the subject transmission/s has or have been received correctly, e.g. based on error coding and/or reception quality. Reception quality may for example be based on a determined signal quality. Acknowledgement information may generally be transmitted to a signaling radio node and/or node arrangement and/or to a network.

Acknowledgement information, or bit/s of a subpattern structure of such information, may represent and/or comprise one or more bits, in particular a pattern of bits. Multiple bits pertaining to a data structure or substructure or message like a control message may be considered a subpattern. The structure or arrangement of acknowledgement information may indicate the order, and/or meaning, and/or mapping, and/or pattern of bits (or subpatterns of bits) of the information. The structure or mapping may in particular indicate one or more data block structures, e.g. code blocks and/or code block groups and/or transport blocks and/or messages, e.g. command messages, the acknowledgement information pertains to, and/or which bits or subpattern of bits are associated to which data block structure. In some cases, the mapping may pertain to one or more acknowledgement signaling processes, e.g. processes with different identifiers, and/or one or more different data streams. The configuration or structure or codebook may indicate to which process/es and/or data stream/s the information pertains. Generally, the acknowledgement information may comprise one or more subpatterns, each of which may pertain to a data block structure, e.g. a code block or code block group or transport block. A subpattern may be arranged to indicate acknowledgement or non-acknowledgement, or another retransmission state like non-scheduling or non-reception, of the associated data block structure. It may be considered that a subpattern comprises one bit, or in some cases more than one bit. It should be noted that acknowledgement information may be subjected to significant processing before being transmitted with acknowledgement signaling. Different configurations may indicate different sizes and/or mapping and/or structures and/or pattern.

An acknowledgment signaling process (providing acknowledgment information) may be a HARQ process, and/or be identified by a process identifier, e.g. a HARQ process identifier or subidentifier. Acknowledgement signaling, and/or associated acknowledgement information, may be referred to as feedback or acknowledgement feedback. It should be noted that data blocks or structures to which subpatterns may pertain may be intended to carry data (e.g., information and/or systemic and/or coding bits). However, depending on transmission conditions, such data may be received or not received (or not received correctly), which may be indicated correspondingly in the feedback. In some cases, a subpattern of acknowledgement signaling may comprise padding bits, e.g. if the acknowledgement information for a data block requires fewer bits than indicated as size of the subpattern. Such may for example happen if the size is indicated by a unit size larger than required for the feedback.

Acknowledgment information may generally indicate at least ACK or NACK, e.g. pertaining to an acknowledgment signaling process, or an element of a data block structure like a data block, subblock group or subblock, or a message, in particular a control message. Generally, to an acknowledgment signaling process there may be associated one specific subpattern and/or a data block structure, for which acknowledgment information may be provided. Acknowledgement information may comprise a plurality of pieces of information, represented in a plurality of HARQ structures.

An acknowledgment signaling process may determine correct or incorrect reception, and/or corresponding acknowledgement information, of a data block like a transport block, and/or substructures thereof, based on coding bits associated to the data block, and/or based on coding bits associated to one or more data block and/or subblocks and/or subblock group/s. Acknowledgement information (determined by an acknowledgement signaling process) may pertain to the data block as a whole, and/or to one or more subblocks or subblock groups. A code block may be considered an example of a subblock, whereas a code block group may be considered an example of a subblock group. Accordingly, the associated subpattern may comprise one or more bits indicating reception status or feedback of the data block, and/or one or more bits indicating reception status or feedback of one or more subblocks or subblock groups. Each subpattern or bit of the subpattern may be associated and/or mapped to a specific data block or subblock or subblock group. In some variants, correct reception for a data block may be indicated if all subblocks or subblock groups are correctly identified. In such a case, the subpattern may represent acknowledgement information for the data block as a whole, reducing overhead in comparison to provide acknowledgement information for the subblocks or subblock groups. The smallest structure (e.g. subblock/subblock group/data block) the subpattern provides acknowledgement information for and/or is associated to may be considered its (highest) resolution. In some variants, a subpattern may provide acknowledgment information regarding several elements of a data block structure and/or at different resolution, e.g. to allow more specific error detection. For example, even if a subpattern indicates acknowledgment signaling pertaining to a data block as a whole, in some variants higher resolution (e.g., subblock or subblock group resolution) may be provided by the subpattern. A subpattern may generally comprise one or more bits indicating ACK/NACK for a data block, and/or one or more bits for indicating ACK/NACK for a subblock or subblock group, or for more than one subblock or subblock group.

A subblock and/or subblock group may comprise information bits (representing the data to be transmitted, e.g. user data and/or downlink/sidelink data or uplink data). It may be considered that a data block and/or subblock and/or subblock group also comprises error one or more error detection bits, which may pertain to, and/or be determined based on, the information bits (for a subblock group, the error detection bit/s may be determined based on the information bits and/or error detection bits and/or error correction bits of the subblock/s of the subblock group). A data block or substructure like subblock or subblock group may comprise error correction bits, which may in particular be determined based on the information bits and error detection bits of the block or substructure, e.g. utilising an error correction coding scheme, e.g. LDPC or polar coding. Generally, the error correction coding of a data block structure (and/or associated bits) may cover and/or pertain to information bits and error detection bits of the structure. A subblock group may represent a combination of one or more code blocks, respectively the corresponding bits. A data block may represent a code block or code block group, or a combination of more than one code block groups. A transport block may be split up in code blocks and/or code block groups, for example based on the bit size of the information bits of a higher layer data structure provided for error coding and/or size requirements or preferences for error coding, in particular error correction coding. Such a higher layer data structure is sometimes also referred to as transport block, which in this context represents information bits without the error coding bits described herein, although higher layer error handling information may be included, e.g. for an internet protocol like TCP. However, such error handling information represents information bits in the context of this disclosure, as the acknowledgement signaling procedures described treat it accordingly.

In some variants, a subblock like a code block may comprise error correction bits, which may be determined based on the information bit/s and/or error detection bit/s of the subblock. An error correction coding scheme may be used for determining the error correction bits, e.g. based on LDPC or polar coding or Reed-Mueller coding. In some cases, a subblock or code block may be considered to be defined as a block or pattern of bits comprising information bits, error detection bit/s determined based on the information bits, and error correction bit/s determined based on the information bits and/or error detection bit/s. It may be considered that in a subblock, e.g. code block, the information bits (and possibly the error correction bit/s) are protected and/or covered by the error correction scheme or corresponding error correction bit/s. A code block group may comprise one or more code blocks. In some variants, no additional error detection bits and/or error correction bits are applied, however, it may be considered to apply either or both. A transport block may comprise one or more code block groups. It may be considered that no additional error detection bits and/or error correction bits are applied to a transport block, however, it may be considered to apply either or both. In some specific variants, the code block group/s comprise no additional layers of error detection or correction coding, and the transport block may comprise only additional error detection coding bits, but no additional error correction coding. This may particularly be true if the transport block size is larger than the code block size and/or the maximum size for error correction coding. A subpattern of acknowledgement signaling (in particular indicating ACK or NACK) may pertain to a code block, e.g. indicating whether the code block has been correctly received. It may be considered that a subpattern pertains to a subgroup like a code block group or a data block like a transport block. In such cases, it may indicate ACK, if all subblocks or code blocks of the group or data/transport block are received correctly (e.g. based on a logical AND operation), and NACK or another state of non-correct reception if at least one subblock or code block has not been correctly received. It should be noted that a code block may be considered to be correctly received not only if it actually has been correctly received, but also if it can be correctly reconstructed based on soft-combining and/or the error correction coding.

A subpattern/HARQ structure may pertain to one acknowledgement signaling process and/or one carrier like a component carrier and/or data block structure or data block. It may in particular be considered that one (e.g. specific and/or single) subpattern pertains, e.g. is mapped by the codebook, to one (e.g., specific and/or single) acknowledgement signaling process, e.g. a specific and/or single HARQ process. It may be considered that in the bit pattern, subpatterns are mapped to acknowledgement signaling processes and/or data blocks or data block structures on a one-to-one basis. In some variants, there may be multiple subpatterns (and/or associated acknowledgment signaling processes) associated to the same component carrier, e.g. if multiple data streams transmitted on the carrier are subject to acknowledgement signaling processes. A subpattern may comprise one or more bits, the number of which may be considered to represent its size or bit size. Different bit n-tupels (n being 1 or larger) of a subpattern may be associated to different elements of a data block structure (e.g., data block or subblock or subblock group), and/or represent different resolutions. There may be considered variants in which only one resolution is represented by a bit pattern, e.g. a data block. A bit n-tupel may represent acknowledgement information (also referred to a feedback), in particular ACK or NACK, and optionally, (if n>1), may represent DTX/DRX or other reception states. ACK/NACK may be represented by one bit, or by more than one bit, e.g. to improve disambiguity of bit sequences representing ACK or NACK, and/or to improve transmission reliability.

The acknowledgement information or feedback information may pertain to a plurality of different transmissions, which may be associated to and/or represented by data block structures, respectively the associated data blocks or data signaling. The data block structures, and/or the corresponding blocks and/or signaling, may be scheduled for simultaneous transmission, e.g. for the same transmission timing structure, in particular within the same slot or subframe, and/or on the same symbol/s. However, alternatives with scheduling for non-simultaneous transmission may be considered. For example, the acknowledgment information may pertain to data blocks scheduled for different transmission timing structures, e.g. different slots (or mini-slots, or slots and mini-slots) or similar, which may correspondingly be received (or not or wrongly received). Scheduling signaling may generally comprise indicating resources, e.g. time and/or frequency resources, for example for receiving or transmitting the scheduled signaling.

References to specific resource structures like transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Some examples of a transmission timing structure are transmission time interval (TTI), subframe, slot and mini-slot. A slot may comprise a predetermined, e.g. predefined and/or configured or configurable, number of symbols, e.g. 6 or 7, or 12 or 14. A mini-slot may comprise a number of symbols (which may in particular be configurable or configured) smaller than the number of symbols of a slot, in particular 1, 2, 3 or 4 symbols. A transmission timing structure may cover a time interval of a specific length, which may be dependent on symbol time length and/or cyclic prefix used. A transmission timing structure may pertain to, and/or cover, a specific time interval in a time stream, e.g. synchronized for communication. Timing structures used and/or scheduled for transmission, e.g. slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology. The timing of a mini-slot may generally be configured or configurable, in particular by the network and/or a network node. The timing may be configurable to start and/or end at any symbol of the transmission timing structure, in particular one or more slots.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc. A carrier medium and/or storage medium may in particular be a non-transitory medium.

A system comprising one or more radio nodes as described herein, in particular a network node and a user equipment, is described. The system may be a wireless communication system, and/or provide and/or represent a radio access network.

Moreover, there may be generally considered a method of operating an information system, the method comprising providing information. Alternatively, or additionally, an information system adapted for providing information may be considered. Providing information may comprise providing information for, and/or to, a target system, which may comprise and/or be implemented as radio access network and/or a radio node, in particular a network node or user equipment or terminal. Providing information may comprise transferring and/or streaming and/or sending and/or passing on the information, and/or offering the information for such and/or for download, and/or triggering such providing, e.g. by triggering a different system or node to stream and/or transfer and/or send and/or pass on the information. The information system may comprise, and/or be connected or connectable to, a target, for example via one or more intermediate systems, e.g. a core network and/or internet and/or private or local network. Information may be provided utilising and/or via such intermediate system/s. Providing information may be for radio transmission and/or for transmission via an air interface and/or utilising a RAN or radio node as described herein. Connecting the information system to a target, and/or providing information, may be based on a target indication, and/or adaptive to a target indication. A target indication may indicate the target, and/or one or more parameters of transmission pertaining to the target and/or the paths or connections over which the information is provided to the target. Such parameter/s may in particular pertain to the air interface and/or radio access network and/or radio node and/or network node. Example parameters may indicate for example type and/or nature of the target, and/or transmission capacity (e.g., data rate) and/or latency and/or reliability and/or cost, respectively one or more estimates thereof. The target indication may be provided by the target, or determined by the information system, e.g. based on information received from the target and/or historical information, and/or be provided by a user, for example a user operating the target or a device in communication with the target, e.g. via the RAN and/or air interface. For example, a user may indicate on a user equipment communicating with the information system that information is to be provided via a RAN, e.g. by selecting from a selection provided by the information system, for example on a user application or user interface, which may be a web interface. An information system may comprise one or more information nodes. An information node may generally comprise processing circuitry and/or communication circuitry. In particular, an information system and/or an information node may be implemented as a computer and/or a computer arrangement, e.g. a host computer or host computer arrangement and/or server or server arrangement. In some variants, an interaction server (e.g., web server) of the information system may provide a user interface, and based on user input may trigger transmitting and/or streaming information provision to the user (and/or the target) from another server, which may be connected or connectable to the interaction server and/or be part of the information system or be connected or connectable thereto. The information may be any kind of data, in particular data intended for a user of for use at a terminal, e.g. video data and/or audio data and/or location data and/or interactive data and/or game-related data and/or environmental data and/or technical data and/or traffic data and/or vehicular data and/or circumstantial data and/or operational data. The information provided by the information system may be mapped to, and/or mappable to, and/or be intended for mapping to, communication or data signaling and/or one or more data channels as described herein (which may be signaling or channel/s of an air interface and/or used within a RAN and/or for radio transmission). It may be considered that the information is formatted based on the target indication and/or target, e.g. regarding data amount and/or data rate and/or data structure and/or timing, which in particular may be pertaining to a mapping to communication or data signaling and/or a data channels. Mapping information to data signaling and/or data channel/s may be considered to refer to using the signaling/channel/s to carry the data, e.g. on higher layers of communication, with the signaling/channel/s underlying the transmission. A target indication generally may comprise different components, which may have different sources, and/or which may indicate different characteristics of the target and/or communication path/s thereto. A format of information may be specifically selected, e.g. from a set of different formats, for information to be transmitted on an air interface and/or by a RAN as described herein. This may be particularly pertinent since an air interface may be limited in terms of capacity and/or of predictability, and/or potentially be cost sensitive. The format may be selected to be adapted to the transmission indication, which may in particular indicate that a RAN or radio node as described herein is in the path (which may be the indicated and/or planned and/or expected path) of information between the target and the information system. A (communication) path of information may represent the interface/s (e.g., air and/or cable interfaces) and/or the intermediate system/s (if any), between the information system and/or the node providing or transferring the information, and the target, over which the information is, or is to be, passed on. A path may be (at least partly) undetermined when a target indication is provided, and/or the information is provided/transferred by the information system, e.g. if an internet is involved, which may comprise multiple, dynamically chosen paths. Information and/or a format used for information may be packet-based, and/or be mapped, and/or be mappable and/or be intended for mapping, to packets. Alternatively, or additionally, there may be considered a method for operating a target device comprising providing a target indicating to an information system. More alternatively, or additionally, a target device may be considered, the target device being adapted for providing a target indication to an information system. In another approach, there may be considered a target indication tool adapted for, and/or comprising an indication module for, providing a target indication to an information system. The target device may generally be a target as described above. A target indication tool may comprise, and/or be implemented as, software and/or application or app, and/or web interface or user interface, and/or may comprise one or more modules for implementing actions performed and/or controlled by the tool. The tool and/or target device may be adapted for, and/or the method may comprise, receiving a user input, based on which a target indicating may be determined and/or provided. Alternatively, or additionally, the tool and/or target device may be adapted for, and/or the method may comprise, receiving information and/or communication signaling carrying information, and/or operating on, and/or presenting (e.g., on a screen and/or as audio or as other form of indication), information. The information may be based on received information and/or communication signaling carrying information. Presenting information may comprise processing received information, e.g. decoding and/or transforming, in particular between different formats, and/or for hardware used for presenting. Operating on information may be independent of or without presenting, and/or proceed or succeed presenting, and/or may be without user interaction or even user reception, for example for automatic processes, or target devices without (e.g., regular) user interaction like MTC devices, of for automotive or transport or industrial use. The information or communication signaling may be expected and/or received based on the target indication. Presenting and/or operating on information may generally comprise one or more processing steps, in particular decoding and/or executing and/or interpreting and/or transforming information. Operating on information may generally comprise relaying and/or transmitting the information, e.g. on an air interface, which may include mapping the information onto signaling (such mapping may generally pertain to one or more layers, e.g. one or more layers of an air interface, e.g. RLC (Radio Link Control) layer and/or MAC layer and/or physical layer/s). The information may be imprinted (or mapped) on communication signaling based on the target indication, which may make it particularly suitable for use in a RAN (e.g., for a target device like a network node or in particular a UE or terminal). The tool may generally be adapted for use on a target device, like a UE or terminal. Generally, the tool may provide multiple functionalities, e.g. for providing and/or selecting the target indication, and/or presenting, e.g. video and/or audio, and/or operating on and/or storing received information. Providing a target indication may comprise transmitting or transferring the indication as signaling, and/or carried on signaling, in a RAN, for example if the target device is a UE, or the tool for a UE. It should be noted that such provided information may be transferred to the information system via one or more additionally communication interfaces and/or paths and/or connections. The target indication may be a higher-layer indication and/or the information provided by the information system may be higher-layer information, e.g. application layer or user-layer, in particular above radio layers like transport layer and physical layer. The target indication may be mapped on physical layer radio signaling, e.g. related to or on the user-plane, and/or the information may be mapped on physical layer radio communication signaling, e.g. related to or on the user-plane (in particular, in reverse communication directions). The described approaches allow a target indication to be provided, facilitating information to be provided in a specific format particularly suitable and/or adapted to efficiently use an air interface. A user input may for example represent a selection from a plurality of possible transmission modes or formats, and/or paths, e.g. in terms of data rate and/or packaging and/or size of information to be provided by the information system.

In general, a numerology and/or subcarrier spacing may indicate the bandwidth (in frequency domain) of a subcarrier of a carrier, and/or the number of subcarriers in a carrier and/or the numbering of the subcarriers in a carrier. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

Reference signaling may be signaling comprising one or more reference symbols and/or structures. Reference signaling may be adapted for gauging and/or estimating and/or representing transmission conditions, e.g. channel conditions and/or transmission path conditions and/or channel (or signal or transmission) quality. It may be considered that the transmission characteristics (e.g., signal strength and/or form and/or modulation and/or timing) of reference signaling are available for both transmitter and receiver of the signaling (e.g., due to being predefined and/or configured or configurable and/or being communicated). Different types of reference signaling may be considered, e.g. pertaining to uplink, downlink or sidelink, cell-specific (in particular, cell-wide, e.g., CRS) or device or user specific (addressed to a specific target or user equipment, e.g., CSI-RS), demodulation-related (e.g., DMRS) and/or signal strength related, e.g. power-related or energy-related or amplitude-related (e.g., SRS or pilot signaling) and/or phase-related, etc.

An antenna arrangement may comprise one or more antenna elements (radiating elements), which may be combined in antenna arrays. An antenna array or subarray may comprise one antenna element, or a plurality of antenna elements, which may be arranged e.g. two dimensionally (for example, a panel) or three dimensionally. It may be considered that each antenna array or subarray or element is separately controllable, respectively that different antenna arrays are controllable separately from each other. A single antenna element/radiator may be considered the smallest example of a subarray. Examples of antenna arrays comprise one or more multi-antenna panels or one or more individually controllable antenna elements. An antenna arrangement may comprise a plurality of antenna arrays. It may be considered that an antenna arrangement is associated to a (specific and/or single) radio node, e.g. a configuring or informing or scheduling radio node, e.g. to be controlled or controllable by the radio node. An antenna arrangement associated to a UE or terminal may be smaller (e.g., in size and/or number of antenna elements or arrays) than the antenna arrangement associated to a network node. Antenna elements of an antenna arrangement may be configurable for different arrays, e.g. to change the beam forming characteristics. In particular, antenna arrays may be formed by combining one or more independently or separately controllable antenna elements or subarrays. The beams may be provided by analog beamforming, or in some variants by digital beamforming. The informing radio nodes may be configured with the manner of beam transmission, e.g. by transmitting a corresponding indicator or indication, for example as beam identify indication. However, there may be considered cases in which the informing radio node/s are not configured with such information, and/or operate transparently, not knowing the way of beamforming used. An antenna arrangement may be considered separately controllable in regard to the phase and/or amplitude/power and/or gain of a signal feed to it for transmission, and/or separately controllable antenna arrangements may comprise an independent or separate transmit and/or receive unit and/or ADC (Analog-Digital-Converter, alternatively an ADC chain) to convert digital control information into an analog antenna feed for the whole antenna arrangement (the ADC may be considered part of, and/or connected or connectable to, antenna circuitry). A scenario in which each antenna element is individually controllable may be referred to as digital beamforming, whereas a scenario in which larger arrays/subarrays are separately controllable may be considered an example of analog beamforming. Hybrid forms may be considered.

Uplink or sidelink signaling may be OFDMA (Orthogonal Frequency Division Multiple Access) or SC-FDMA (Single Carrier Frequency Division Multiple Access) signaling. Downlink signaling may in particular be OFDMA signaling. However, signaling is not limited thereto (Filter-Bank based signaling may be considered one alternative).

A radio node may generally be considered a device or node adapted for wireless and/or radio (and/or microwave) frequency communication, and/or for communication utilising an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or transmission point (TP) and/or access point (AP) and/or other node, in particular for a RAN as described herein.

The terms wireless device, user equipment (UE) and terminal may be considered to be interchangeable in the context of this disclosure. A wireless device, user equipment or terminal may represent an end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary.

A radio node may generally comprise processing circuitry and/or radio circuitry. A radio node, in particular a network node, may in some cases comprise cable circuitry and/or communication circuitry, with which it may be connected or connectable to another radio node and/or a core network.

Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM).

Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas and/or antenna arrays. An antenna array may comprise one or more antennas, which may be arranged in a dimensional array, e.g. 2D or 3D array, and/or antenna panels. A remote radio head (RRH) may be considered as an example of an antenna array. However, in some variants, a RRH may be also be implemented as a network node, depending on the kind of circuitry and/or functionality implemented therein.

Communication circuitry may comprise radio circuitry and/or cable circuitry. Communication circuitry generally may comprise one or more interfaces, which may be air interface/s and/or cable interface/s and/or optical interface/s, e.g. laser-based. Interface/s may be in particular packet-based. Cable circuitry and/or a cable interfaces may comprise, and/or be connected or connectable to, one or more cables (e.g., optical fiber-based and/or wire-based), which may be directly or indirectly (e.g., via one or more intermediate systems and/or interfaces) be connected or connectable to a target, e.g. controlled by communication circuitry and/or processing circuitry.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries. A program product as described herein may comprise the modules related to a device on which the program product is intended (e.g., a user equipment or network node) to be executed (the execution may be performed on, and/or controlled by the associated circuitry).

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes, and/or one or more terminals, and/or one or more radio nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary. A RAN or a wireless communication network may comprise at least one network node and a UE, or at least two radio nodes. There may be generally considered a wireless communication network or system, e.g. a RAN or RAN system, comprising at least one radio node, and/or at least one network node and at least one terminal.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Control information or a control information message or corresponding signaling (control signaling) may be transmitted on a control channel, e.g. a physical control channel, which may be a downlink channel or (or a sidelink channel in some cases, e.g. one UE scheduling another UE). For example, control information/allocation information may be signaled by a network node on PDCCH (Physical Downlink Control Channel) and/or a PDSCH (Physical Downlink Shared Channel) and/or a HARQ-specific channel. Acknowledgement signaling, e.g. as a form of control information or signaling like uplink control information/signaling, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Signaling may generally be considered to represent an electromagnetic wave structure (e.g., over a time interval and frequency interval), which is intended to convey information to at least one specific or generic (e.g., anyone who might pick up the signaling) target. A process of signaling may comprise transmitting the signaling. Transmitting signaling, in particular control signaling or communication signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation. Error detection coding may comprise, and/or be based on, parity or checksum approaches, e.g. CRC (Cyclic Redundancy Check). Forward error correction coding may comprise and/or be based on for example turbo coding and/or Reed-Muller coding, and/or polar coding and/or LDPC coding (Low Density Parity Check). The type of coding used may be based on the channel (e.g., physical channel) the coded signal is associated to. A code rate may represent the ratio of the number of information bits before encoding to the number of encoded bits after encoding, considering that encoding adds coding bits for error detection coding and forward error correction. Coded bits may refer to information bits (also called systematic bits) plus coding bits.

Communication signaling may comprise, and/or represent, and/or be implemented as, data signaling, and/or user plane signaling. Communication signaling may be associated to a data channel, e.g. a physical downlink channel or physical uplink channel or physical sidelink channel, in particular a PDSCH (Physical Downlink Shared Channel) or PSSCH (Physical Sidelink Shared Channel). Generally, a data channel may be a shared channel or a dedicated channel. Data signaling may be signaling associated to and/or on a data channel.

An indication generally may explicitly and/or implicitly indicate the information it represents and/or indicates. Implicit indication may for example be based on position and/or resource used for transmission. Explicit indication may for example be based on a parametrisation with one or more parameters, and/or one or more index or indices, and/or one or more bit patterns or bit fields representing the information. It may in particular be considered that control signaling as described herein, based on the utilised resource sequence, implicitly indicates the control signaling type.

A resource element may generally describe the smallest individually usable and/or encodable and/or decodable and/ or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE. As symbol time length and/or subcarrier spacing (and/or numerology) may be different between different symbols and/or subcarriers, different resource elements may have different extension (length/width) in time and/or frequency domain, in particular resource elements pertaining to different carriers.

A resource generally may represent a time-frequency and/or code resource, on which signaling, e.g. according to a specific format, may be communicated, for example transmitted and/or received, and/or be intended for transmission and/or reception.

A border symbol may generally represent a starting symbol or an ending symbol for transmitting and/or receiving. A starting symbol may in particular be a starting symbol of uplink or sidelink signaling, for example control signaling or data signaling. Such signaling may be on a data channel or control channel, e.g. a physical channel, in particular a physical uplink shared channel (like PUSCH) or a sidelink data or shared channel, or a physical uplink control channel (like PUCCH) or a sidelink control channel. If the starting symbol is associated to control signaling (e.g., on a control channel), the control signaling may be in response to received signaling (in sidelink or downlink), e.g. representing acknowledgement signaling associated thereto, which may be HARQ or ARQ signaling. An ending symbol may represent an ending symbol (in time) of downlink or sidelink transmission or signaling, which may be intended or scheduled for the radio node or user equipment. Such downlink signaling may in particular be data signaling, e.g. on a physical downlink channel like a shared channel, e.g. a PDSCH (Physical Downlink Shared Channel). A starting symbol may be determined based on, and/or in relation to, such an ending symbol.

Configuring a radio node, in particular a terminal or user equipment, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilise, and/or be adapted to utilise, its circuitry/ies for configuring. Allocation information may be considered a form of configuration data. Configuration data may comprise and/or be represented by configuration information, and/or one or more corresponding indications and/or message/s Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor.

A resource structure may be considered to be neighbored in frequency domain by another resource structure, if they share a common border frequency, e.g. one as an upper frequency border and the other as a lower frequency border. Such a border may for example be represented by the upper end of a bandwidth assigned to a subcarrier n, which also represents the lower end of a bandwidth assigned to a subcarrier n+1. A resource structure may be considered to be neighbored in time domain by another resource structure, if they share a common border time, e.g. one as an upper (or right in the figures) border and the other as a lower (or left in the figures) border. Such a border may for example be represented by the end of the symbol time interval assigned to a symbol n, which also represents the beginning of a symbol time interval assigned to a symbol n+1.

Generally, a resource structure being neighbored by another resource structure in a domain may also be referred to as abutting and/or bordering the other resource structure in the domain.

A resource structure may general represent a structure in time and/or frequency domain, in particular representing a time interval and a frequency interval. A resource structure may comprise and/or be comprised of resource elements, and/or the time interval of a resource structure may comprise and/or be comprised of symbol time interval/s, and/or the frequency interval of a resource structure may comprise and/or be comprised of subcarrier/s. A resource element may be considered an example for a resource structure, a slot or mini-slot or a Physical Resource Block (PRB) or parts thereof may be considered others. A resource structure may be associated to a specific channel, e.g. a PUSCH or PUCCH, in particular resource structure smaller than a slot or PRB.

Examples of a resource structure in frequency domain comprise a bandwidth or band, or a bandwidth part. A bandwidth part may be a part of a bandwidth available for a radio node for communicating, e.g. due to circuitry and/or configuration and/or regulations and/or a standard. A bandwidth part may be configured or configurable to a radio node. In some variants, a bandwidth part may be the part of a bandwidth used for communicating, e.g. transmitting and/or receiving, by a radio node. The bandwidth part may be smaller than the bandwidth (which may be a device bandwidth defined by the circuitry/configuration of a device, and/or a system bandwidth, e.g. available for a RAN). It may be considered that a bandwidth part comprises one or more resource blocks or resource block groups, in particular one or more PRBs or PRB groups. A bandwidth part may pertain to, and/or comprise, one or more carriers.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilising microwave and/or millimeter and/or other frequencies, in particular between 100 MHz or 1 GHz, and 100 GHz or 20 or 10 GHz. Such communication may utilise one or more carriers.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. Examples of channels comprise a channel for low latency and/or high reliability transmission, in particular a channel for Ultra-Reliable Low Latency Communication (URLLC), which may be for control and/or data.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of, or associated to, a symbol. Accordingly, different symbols may have different symbol time lengths. In particular, numerologies with different subcarrier spacings may have different symbol time length. Generally, a symbol time length may be based on, and/or include, a guard time interval or cyclic extension, e.g. prefix or postfix.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g. a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g. according to a specific license and/or standard. Participants may share a (physical) channel and/or resources, in particular in frequency domain and/or related to a frequency resource like a carrier) of a sidelink, such that two or more participants transmit thereon, e.g. simultaneously, and/or time-shifted, and/or there may be associated specific channels and/or resources to specific participants, so that for example only one participant transmits on a specific channel or on a specific resource or specific resources, e.g., in frequency domain and/or related to one or more carriers or subcarriers.

A sidelink may comply with, and/or be implemented according to, a specific standard, e.g. a LTE-based standard and/or NR. A sidelink may utilise TDD (Time Division Duplex) and/or FDD (Frequency Division Duplex) technology, e.g. as configured by a network node, and/or preconfigured and/or negotiated between the participants. A user equipment may be considered to be adapted for sidelink communication if it, and/or its radio circuitry and/or processing circuitry, is adapted for utilising a sidelink, e.g. on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

Communication or communicating may generally comprise transmitting and/or receiving signaling. Communication on a sidelink (or sidelink signaling) may comprise utilising the sidelink for communication (respectively, for signaling). Sidelink transmission and/or transmitting on a sidelink may be considered to comprise transmission utilising the sidelink, e.g. associated resources and/or transmission formats and/or circuitry and/or the air interface. Sidelink reception and/or receiving on a sidelink may be considered to comprise reception utilising the sidelink, e.g. associated resources and/or transmission formats and/or circuitry and/or the air interface. Sidelink control information (e.g., SCI) may generally be considered to comprise control information transmitted utilising a sidelink.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be send over more than one carrier of an aggregate, e.g. one or more PCCs and one PCC and one or more SCCs.

A transmission may generally pertain to a specific channel and/or specific resources, in particular with a starting symbol and ending symbol in time, covering the interval therebetween. A scheduled transmission may be a transmission scheduled and/or expected and/or for which resources are scheduled or provided or reserved. However, not every scheduled transmission has to be realized. For example, a scheduled downlink transmission may not be received, or a scheduled uplink transmission may not be transmitted due to power limitations, or other influences (e.g., a channel on an unlicensed carrier being occupied). A transmission may be scheduled for a transmission timing substructure (e.g., a mini-slot, and/or covering only a part of a transmission timing structure) within a transmission timing structure like a slot. A border symbol may be indicative of a symbol in the transmission timing structure at which the transmission starts or ends.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

A configuration or schedule, like a mini-slot configuration and/or structure configuration, may schedule transmissions, e.g. for the time/transmissions it is valid, and/or transmissions may be scheduled by separate signaling or separate configuration, e.g. separate RRC signaling and/or downlink control information signaling. The transmission/s scheduled may represent signaling to be transmitted by the device for which it is scheduled, or signaling to be received by the device for which it is scheduled, depending on which side of a communication the device is. It should be noted that downlink control information or specifically DCI signaling may be considered physical layer signaling, in contrast to higher layer signaling like MAC (Medium Access Control) signaling or RRC layer signaling. The higher the layer of signaling is, the less frequent/the more time/resource consuming it may be considered, at least partially due to the information contained in such signaling having to be passed on through several layers, each layer requiring processing and handling.

A scheduled transmission, and/or transmission timing structure like a mini-slot or slot, may pertain to a specific channel, in particular a physical uplink shared channel, a physical uplink control channel, or a physical downlink shared channel, e.g. PUSCH, PUCCH or PDSCH, and/or may pertain to a specific cell and/or carrier aggregation. A corresponding configuration, e.g. scheduling configuration or symbol configuration may pertain to such channel, cell and/or carrier aggregation. It may be considered that the scheduled transmission represents transmission on a physical channel, in particular a shared physical channel, for example a physical uplink shared channel or physical downlink shared channel. For such channels, semi-persistent configuring may be particularly suitable.

Generally, a configuration may be a configuration indicating timing, and/or be represented or configured with corresponding configuration data. A configuration may be embedded in, and/or comprised in, a message or configuration or corresponding data, which may indicate and/or schedule resources, in particular semi-persistently and/or semi-statically.

A control region of a transmission timing structure may be an interval in time for intended or scheduled or reserved for control signaling, in particular downlink control signaling, and/or for a specific control channel, e.g. a physical downlink control channel like PDCCH. The interval may comprise, and/or consist of, a number of symbols in time, which may be configured or configurable, e.g. by (UE-specific) dedicated signaling (which may be single-cast, for example addressed to or intended for a specific UE), e.g. on a PDCCH, or RRC signaling, or on a multicast or broadcast channel. In general, the transmission timing structure may comprise a control region covering a configurable number of symbols. It may be considered that in general the border symbol is configured to be after the control region in time.

The duration of a symbol (symbol time length or interval) of the transmission timing structure may generally be dependent on a numerology and/or carrier, wherein the numerology and/or carrier may be configurable. The numerology may be the numerology to be used for the scheduled transmission.

Scheduling a device, or for a device, and/or related transmission or signaling, may be considered comprising, or being a form of, configuring the device with resources, and/or of indicating to the device resources, e.g. to use for communicating. Scheduling may in particular pertain to a transmission timing structure, or a substructure thereof (e.g., a slot or a mini-slot, which may be considered a substructure of a slot). It may be considered that a border symbol may be identified and/or determined in relation to the transmission timing structure even if for a substructure being scheduled, e.g. if an underlying timing grid is defined based on the transmission timing structure. Signaling indicating scheduling may comprise corresponding scheduling information and/or be considered to represent or contain configuration data indicating the scheduled transmission and/or comprising scheduling information. Such configuration data or signaling may be considered a resource configuration or scheduling configuration. It should be noted that such a configuration (in particular as single message) in some cases may not be complete without other configuration data, e.g. configured with other signaling, e.g. higher layer signaling. In particular, the symbol configuration may be provided in addition to scheduling/resource configuration to identify exactly which symbols are assigned to a scheduled transmission. A scheduling (or resource) configuration may indicate transmission timing structure/s and/or resource amount (e.g., in number of symbols or length in time) for a scheduled transmission.

A scheduled transmission may be transmission scheduled, e.g. by the network or network node. Transmission may in this context may be uplink (UL) or downlink (DL) or sidelink (SL) transmission. A device, e.g. a user equipment, for which the scheduled transmission is scheduled, may accordingly be scheduled to receive (e.g., in DL or SL), or to transmit (e.g. in UL or SL) the scheduled transmission. Scheduling transmission may in particular be considered to comprise configuring a scheduled device with resource/s for this transmission, and/or informing the device that the transmission is intended and/or scheduled for some resources. A transmission may be scheduled to cover a time interval, in particular a successive number of symbols, which may form a continuous interval in time between (and including) a starting symbol and an ending symbols. The starting symbol and the ending symbol of a (e.g., scheduled) transmission may be within the same transmission timing structure, e.g. the same slot.

However, in some cases, the ending symbol may be in a later transmission timing structure than the starting symbol, in particular a structure following in time. To a scheduled transmission, a duration may be associated and/or indicated, e.g. in a number of symbols or associated time intervals. In some variants, there may be different transmissions scheduled in the same transmission timing structure. A scheduled transmission may be considered to be associated to a specific channel, e.g. a shared channel like PUSCH or PDSCH.

In the context of this disclosure, there may be distinguished between dynamically scheduled or aperiodic transmission and/or configuration, and semi-static or semi-persistent or periodic transmission and/or configuration. The term "dynamic" or similar terms may generally pertain to configuration/transmission valid and/or scheduled and/or configured for (relatively) short timescales and/or a (e.g., predefined and/or configured and/or limited and/or definite) number of occurrences and/or transmission timing structures, e.g. one or more transmission timing structures like slots or slot aggregations, and/or for one or more (e.g., specific number) of transmission/occurrences. Dynamic configuration may be based on low-level signaling, e.g. control signaling on the physical layer and/or MAC layer, in particular in the form of DCI or SCI. Periodic/semi-static may pertain to longer timescales, e.g. several slots and/or more than one frame, and/or a non-defined number of occurrences, e.g., until a dynamic configuration contradicts, or until a new periodic configuration arrives. A periodic or semi-static configuration may be based on, and/or be configured with, higher-layer signaling, in particular RCL layer signaling and/or RRC signaling and/or MAC signaling.

A transmission timing structure may comprise a plurality of symbols, and/or define an interval comprising several symbols (respectively their associated time intervals). In the context of this disclosure, it should be noted that a reference to a symbol for ease of reference may be interpreted to refer to the time domain projection or time interval or time component or duration or length in time of the symbol, unless it is clear from the context that the frequency domain component also has to be considered. Examples of transmission timing structures include slot, subframe, mini-slot (which also may be considered a substructure of a slot), slot aggregation (which may comprise a plurality of slots and may be considered a superstructure of a slot), respectively their time domain component. A transmission timing structure may generally comprise a plurality of symbols defining the time domain extension (e.g., interval or length or duration) of the transmission timing structure, and arranged neighboring to each other in a numbered sequence. A timing structure (which may also be considered or implemented as synchronisation structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signaling is received, e.g. in relation to the timing grid. A transmission timing structure may in particular be a slot or subframe or in some cases, a mini-slot.

Feedback signaling may be considered a form or control signaling, e.g. uplink or sidelink control signaling, like UCI (Uplink Control Information) signaling or SCI (Sidelink Control Information) signaling. Feedback signaling may in particular comprise and/or represent acknowledgement signaling and/or acknowledgement information and/or measurement reporting.

Acknowledgement information may comprise an indication of a specific value or state for an acknowledgement signaling process, e.g. ACK or NACK or DTX. Such an indication may for example represent a bit or bit value or bit pattern or an information switch. Different levels of acknowledgement information, e.g. providing differentiated information about quality of reception and/or error position in received data element/s may be considered and/or represented by control signaling. Acknowledgment information may generally indicate acknowledgment or non-acknowledgment or non-reception or different levels thereof, e.g. representing ACK or NACK or DTX. Acknowledgment information may pertain to one acknowledgement signaling process. Acknowledgement signaling may comprise acknowledgement information pertaining to one or more acknowledgement signaling processes, in particular one or more HARQ or ARQ processes. It may be considered that to each acknowledgment signaling process the acknowledgement information pertains to, a specific number of bits of the information size of the control signaling is assigned. Measurement reporting signaling may comprise measurement information.

Signaling may generally comprise one or more symbols and/or signals and/or messages. A signal may comprise and/or represent one or more bits, which may be modulated into a common modulated signal. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different acknowledgement signaling processes, e.g. representing and/or pertaining to one or more such processes. An indication may comprise signaling and/or a plurality of signals and/or messages and/or may be comprised therein, which may be transmitted on different carriers and/or be associated to different acknowledgement signaling processes, e.g. representing and/or pertaining to one or more such processes.

Signaling utilising, and/or on and/or associated to, resources or a resource structure may be signaling covering the resources or structure, signaling on the associated frequency/ies and/or in the associated time interval/s. It may be considered that a signaling resource structure comprises and/or encompasses one or more substructures, which may be associated to one or more different channels and/or types of signaling and/or comprise one or more holes (resource element/s not scheduled for transmissions or reception of transmissions). A resource substructure, e.g. a feedback resource structure, may generally be continuous in time and/or frequency, within the associated intervals. It may be considered that a substructure, in particular a feedback resource structure, represents a rectangle filled with one or more resource elements in time/frequency space. However, in some cases, a resource structure or substructure, in particular a frequency resource range, may represent a non-continuous pattern of resources in one or more domains, e.g. time and/or frequency. The resource elements of a substructure may be scheduled for associated signaling.

It should generally be noted that the number of bits or a bit rate associated to specific signaling that can be carried on a resource element may be based on a modulation and coding scheme (MCS). Thus, bits or a bit rate may be seen as a form of resources representing a resource structure or range in frequency and/or time, e.g. depending on MCS. The MCS may be configured or configurable, e.g. by control signaling, e.g. DCI or MAC (Medium Access Control) or RRC (Radio Resource Control) signaling. Different formats of for control information may be considered, e.g. different formats for a control channel like a Physical Uplink Control Channel (PUCCH). PUCCH may carry control information or corresponding control signaling, e.g. Uplink Control Information (UCI). UCI may comprise feedback signaling, and/or acknowledgement signaling like HARQ feedback (ACK/NACK), and/or measurement information signaling, e.g. comprising Channel Quality Information (CQI), and/or Scheduling Request (SR) signaling. One of the supported PUCCH formats may be short, and may e.g. occur at the end of a slot interval, and/or multiplexed and/or neighboring to PUSCH. Similar control information may be provided on a sidelink, e.g. as Sidelink Control Information (SCI), in particular on a (physical) sidelink control channel, like a (P)SCCH.

A code block may be considered a subelement of a data element like a transport block, e.g., a transport block may comprise a one or a plurality of code blocks.

A scheduling assignment may be configured with control signaling, e.g. downlink control signaling or sidelink control signaling. Such controls signaling may be considered to represent and/or comprise scheduling signaling, which may indicate scheduling information. A scheduling assignment may be considered scheduling information indicating scheduling of signaling/transmission of signaling, in particular pertaining to signaling received or to be received by the device configured with the scheduling assignment. It may be considered that a scheduling assignment may indicate data (e.g., data block or element and/or channel and/or data stream) and/or an (associated) acknowledgement signaling process and/or resource/s on which the data (or, in some cases, reference signaling) is to be received and/or indicate resource/s for associated feedback signaling, and/or a feedback resource range on which associated feedback signaling is to be transmitted. Transmission associated to an acknowledgement signaling process, and/or the associated resources or resource structure, may be configured and/or scheduled, for example by a scheduling assignment. Different scheduling assignments may be associated to different acknowledgement signaling processes. A scheduling assignment may be considered an example of downlink control information or signaling, e.g. if transmitted by a network node and/or provided on downlink (or sidelink control information if transmitted using a sidelink and/or by a user equipment).

A scheduling grant (e.g., uplink grant) may represent control signaling (e.g., downlink control information/signaling). It may be considered that a scheduling grant configures the signaling resource range and/or resources for uplink (or sidelink) signaling, in particular uplink control signaling and/or feedback signaling, e.g. acknowledgement signaling. Configuring the signaling resource range and/or resources may comprise configuring or scheduling it for transmission by the configured radio node. A scheduling grant may indicate a channel and/or possible channels to be used/ usable for the feedback signaling, in particular whether a shared channel like a PUSCH may be used/is to be used. A scheduling grant may generally indicate uplink resource/s and/or an uplink channel and/or a format for control information pertaining to associated scheduling assignments. Both grant and assignment/s may be considered (downlink or sidelink) control information, and/or be associated to, and/or transmitted with, different messages.

A resource structure in frequency domain (which may be referred to as frequency interval and/or range) may be represented by a subcarrier grouping. A subcarrier grouping may comprise one or more subcarriers, each of which may represent a specific frequency interval, and/or bandwidth. The bandwidth of a subcarrier, the length of the interval in frequency domain, may be determined by the subcarrier spacing and/or numerology. The subcarriers may be arranged such that each subcarrier neighbours at least one other subcarrier of the grouping in frequency space (for grouping sizes larger than 1). The subcarriers of a grouping may be associated to the same carrier, e.g. configurably or configured of predefined. A physical resource block may be considered representative of a grouping (in frequency domain). A subcarrier grouping may be considered to be associated to a specific channel and/or type of signaling, it transmission for such channel or signaling is scheduled and/or transmitted and/or intended and/or configured for at least one, or a plurality, or all subcarriers in the grouping. Such association may be time-dependent, e.g. configured or configurable or predefined, and/or dynamic or semi-static. The association may be different for different devices, e.g. configured or configurable or predefined, and/or dynamic or semi-static. Patterns of subcarrier groupings may be considered, which may comprise one or more subcarrier groupings (which may be associated to same or different signalings/channels), and/or one or more groupings without associated signaling (e.g., as seen from a specific device). An example of a pattern is a comb, for which between pairs of groupings associated to the same signaling/channel there are arranged one or more groupings associated to one or more different channels and/or signaling types, and/or one or more groupings without associated channel/signaling).

Example types of signaling comprise signaling of a specific communication direction, in particular, uplink signaling, downlink signaling, sidelink signaling, as well as reference signaling (e.g., SRS or CRS or CSI-RS), communication signaling, control signaling, and/or signaling associated to a specific channel like PUSCH, PDSCH, PUCCH, PDCCH, PSCCH, PSSCH, etc.).

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM). While described variants may pertain to certain Technical Specifications (TSs) of the Third Generation Partnership Project (3GPP), it will be appreciated that the present approaches, concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise

| Abbreviation | Explanation |
| --- | --- |
| ACK/NACK | Acknowledgment/Negative Acknowledgement |
| ARQ | Automatic Repeat reQuest |
| CAZAC | Constant Amplitude Zero Cross Correlation |
| CB | Code Block |
| CBG | Code Block Group |
| CDM | Code Division Multiplex |
| CM | Cubic Metric |
| CQI | Channel Quality Information |
| CRC | Cyclic Redundancy Check |
| CRS | Common reference signal |
| CSI | Channel State Information |
| CSI-RS | Channel state information reference signal |
| DAI | Downlink Assignment Indicator |
| DCI | Downlink Control Information |
| DFT | Discrete Fourier Transform |
| DM(-)RS | Demodulation reference signal(ing) |
| FDD | Frequency Division Duplex |
| FDM | Frequency Division Multiplex |
| HARQ | Hybrid Automatic Repeat Request |
| IFFT | Inverse Fast Fourier Transform |
| MBB | Mobile Broadband |
| MCS | Modulation and Coding Scheme |
| MIMO | Multiple-input-multiple-output |
| MRC | Maximum-ratio combining |
| MRT | Maximum-ratio transmission |
| MU-MIMO | Multiuser multiple-input-multiple-output |
| OFDM/A | Orthogonal Frequency Division Multiplex/Multiple Access |
| PAPR | Peak to Average Power Ratio |
| PDCCH | Physical Downlink Control Channel |
| PDSCH | Physical Downlink Shared Channel |
| PRACH | Physical Random Access CHannel |
| PRB | Physical Resource Block |
| PUCCH | Physical Uplink Control Channel |
| PUSCH | Physical Uplink Shared Channel |
| (P)SCCH | (Physical) Sidelink Control Channel |
| (P)SSCH | (Physical) Sidelink Shared Channel |
| RAN | Radio Access Network |
| RAT | Radio Access Technology |
| RB | Resource Block |
| RRC | Radio Resource Control |
| SA | Scheduling Assignment |
| SC-FDM/A | Single Carrier Frequency Division Multiplex/Multiple Access |
| SCI | Sidelink Control Information |
| SINR | Signal-to-interference-plus-noise ratio |
| SIR | Signal-to-interference ratio |
| SNR | Signal-to-noise-ratio |
| SR | Scheduling Request |
| SRS | Sounding Reference Signal(ing) |
| SVD | Singular-value decomposition |
| TB | Transport Block |
| TDD | Time Division Duplex |
| TDM | Time Division Multiplex |
| UCI | Uplink Control Information |
| UE | User Equipment |
| URLLC | Ultra Low Latency High Reliability Communication |
| VL-MIMO | Very-large multiple-input-multiple-output |
| ZF | Zero Forcing |

Abbreviations may be considered to follow 3GPP usage if applicable.

The invention claimed is:

1. A method of operating a user equipment in a radio access network, the method comprising:
transmitting acknowledgement signaling according to a HARQ codebook at a second HARQ transmitting occasion, the HARQ codebook indicating first acknowledgement information, the first acknowledgement information pertaining to first data signaling scheduled to be received by the user equipment before a first HARQ transmitting occasion that occurred earlier in time than the second HARQ transmitting occasion, the first acknowledgement information being transmitted at the second HARQ transmitting occasion based on an inclusion indication received by the user equipment in a DCI message.

2. The method according to claim 1, wherein the first acknowledgment information is indicated by the HARQ codebook based on an inclusion indication.

3. The method according to claim 1, wherein the HARQ codebook indicates second acknowledgement information pertaining to data signaling scheduled to be received later in time than the first HARQ transmitting occasion.

4. The method according to claim 1, wherein the first acknowledgement information is based on logical-AND concatenation of a plurality of ACK/NACK bits associated to the first data signaling.

5. The method according to claim 1, wherein the HARQ codebook is determined based on control information signaling including a counter, wherein the counter pertains to second acknowledgment information pertaining to data signaling scheduled to be received later in time than the first HARQ transmitting occasion, wherein the counter starts at a value larger than a reset value to indicate inclusion of the first acknowledgment information.

6. The method according to claim 1, wherein the HARQ codebook is a dynamic HARQ codebook.

7. The method according to claim 1, wherein at least one of the first acknowledgement information and the second acknowledgement information pertaining to data signaling scheduled to be received later in time than the first HARQ transmitting occasion, includes ACK/NACK bits pertaining to one or more code block groups.

8. The method according to claim 1, wherein an inclusion indication indicating inclusion of the first acknowledgement information into the acknowledgement signaling based on the HARQ codebook is transmitted in a downlink control information message.

9. The method according to claim 1, wherein ACK/NACK bits associated to the first data signaling are determined at least one of:
   before scheduled reception of second data signaling scheduled to be later in time than the first HARQ transmission occasion; and
   before the first HARQ transmission occasion.

10. The method according to claim 1, wherein the first HARQ transmission occasion is in a different time slot than the second HARQ transmission occasion.

11. A user equipment for a radio access network, the user equipment comprising:
   processing circuitry, the processing circuitry configured to:
      cause transmission of acknowledgement signaling according to a HARQ codebook at a second HARQ transmitting occasion, the HARQ codebook indicating first acknowledgement information, the first acknowledgement information pertaining to first data signaling scheduled to be received by the user equipment before a first HARQ transmitting occasion that occurred earlier in time than the second HARQ transmitting occasion, the first acknowledgement information being transmitted at the second HARQ transmitting occasion based on an inclusion indication received by the user equipment in a DCI message.

12. A method of operating a radio node in a radio access network, the method comprising:
   receiving acknowledgement signaling from a user equipment according to a HARQ codebook, the HARQ codebook indicating first acknowledgement information, the first acknowledgement information pertaining to first data signaling scheduled to be received by the user equipment before a first HARQ transmitting occasion that occurred earlier in time than a second HARQ transmitting occasion, the first acknowledgement information being transmitted at the second HARQ transmitting occasion based on an inclusion indication received by the user equipment in a DCI message.

13. The method according to claim 12, wherein the first acknowledgment information is indicated by the HARQ codebook based on an inclusion indication.

14. The method according to claim 12, wherein the HARQ codebook indicates second acknowledgement information pertaining to data signaling scheduled to be received later in time than the first HARQ transmitting occasion.

15. The method according to claim 12, wherein the first acknowledgement information is based on logical-AND concatenation of a plurality of ACK/NACK bits associated to the first data signaling.

16. The method according to claim 12, wherein the HARQ codebook is determined based on control information signaling including a counter, wherein the counter pertains to second acknowledgment information pertaining to data signaling scheduled to be received later in time than the first HARQ transmitting occasion, wherein the counter starts at a value larger than a reset value to indicate inclusion of the first acknowledgment information.

17. The method according to claim 12, wherein the HARQ codebook is a dynamic HARQ codebook.

18. The method according to claim 12, wherein at least one of the first acknowledgement information and the second acknowledgement information pertaining to data signaling scheduled to be received later in time than the first HARQ transmitting occasion, includes ACK/NACK bits pertaining to one or more code block groups.

19. A radio node for a radio access network, the radio node comprising:
   processing circuitry configured to:
      receive acknowledgement signaling from a user equipment according to a HARQ codebook, the HARQ codebook indicating first acknowledgement information, the first acknowledgement information pertaining to first data signaling scheduled to be received by the user equipment before a first HARQ transmitting occasion that occurred earlier in time than the second HARQ transmitting occasion, the first acknowledgement information being transmitted at a second HARQ transmitting occasion based on an inclusion indication received by the user equipment in a DCI message.

20. A non-transitory computer storage medium storing an executable computer program comprising instructions which, when executed, cause processing circuitry to at least one of control and perform a method of operating a user equipment in a radio access network, the method comprising:
   transmitting acknowledgement signaling according to a HARQ codebook at a second HARQ transmitting occasion, the HARQ codebook indicating first acknowledgement information, the first acknowledgement information pertaining to first data signaling scheduled to be received by the user equipment before a first HARQ transmitting occasion that occurred earlier in time than the second HARQ transmitting occasion, the first acknowledgement information being transmitted at the second HARQ transmitting occasion based on an inclusion indication received by the user equipment in a DCI message.

* * * * *